US012565118B2

(12) United States Patent
Sharma et al.

(10) Patent No.: US 12,565,118 B2
(45) Date of Patent: Mar. 3, 2026

(54) METHOD OF PROVIDING INFORMATION WHEN AN ELECTRIC VEHICLE IS USED AS A BATTERY PACK

(71) Applicant: GM Global Technology Operations LLC, Detroit, MI (US)

(72) Inventors: Manoj Kumar Sharma, Troy, MI (US); Michael Alan Losh, Rochester Hills, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 160 days.

(21) Appl. No.: 18/448,520

(22) Filed: Aug. 11, 2023

(65) Prior Publication Data

US 2025/0050785 A1      Feb. 13, 2025

(51) Int. Cl.
B60L 58/14            (2019.01)

(52) U.S. Cl.
CPC ......... B60L 58/14 (2019.02); *B60L 2240/547* (2013.01); *B60L 2240/60* (2013.01); *B60L 2250/16* (2013.01)

(58) Field of Classification Search
CPC ............... B60L 58/14; B60L 2240/547; B60L 2240/60; B60L 2250/16
See application file for complete search history.

(56) References Cited

U.S. PATENT DOCUMENTS 5,757,595 A      5/1998   Ozawa et al.
8,063,757 B2    11/2011   Frey et al.

9,818,268 B2    11/2017   Muntada Roura
10,513,197 B1   12/2019   Carpenter et al.
10,946,760 B2    3/2021   Miftakhov
11,580,798 B2    2/2023   Weber et al.
11,718,189 B2    8/2023   Coburn et al.
2009/0082957 A1  3/2009   Agassi et al.
2010/0094496 A1  4/2010   Hershkovitz et al.

(Continued)

FOREIGN PATENT DOCUMENTS

DE      102013226188 A1    7/2014
DE      102014222695 A1   10/2015
DE      102018220429 A1    5/2020

OTHER PUBLICATIONS

English Translation of DE102018219974A1 Title:Projection Arrangement, Charging Station And Method For Projecting At Least One Charging Information Author: Ruppert Daniel Date: May 28, 2020 (Year: 2020).*

*Primary Examiner* — Steven Vu Nguyen
(74) *Attorney, Agent, or Firm* — Vivacqua Crane, PLLC

(57)            ABSTRACT

A method of providing information related to a charge status of an electric vehicle when the electric vehicle is being used as a battery pack includes detecting, with a system controller in communication with an electrical system within the vehicle, when the electric vehicle is being used to provide power to an external electrical device, and when the electric vehicle is being used to provide power to an external electrical device, monitoring, with the system controller in communication with the electrical system within the electric vehicle, information related to a charge status of the electric vehicle, and providing notification, to a person in proximity to the electric vehicle, with the system controller, the charge status of the electric vehicle.

17 Claims, 6 Drawing Sheets

(56)     References Cited

U.S. PATENT DOCUMENTS

| | | | |
|---|---|---|---|
| 2011/0043355 A1 | 2/2011 | Chander et al. | |
| 2012/0025765 A1 | 2/2012 | Frey et al. | |
| 2012/0242466 A1 | 9/2012 | Stillfried et al. | |
| 2012/0309455 A1 | 12/2012 | Klose et al. | |
| 2014/0253306 A1 | 9/2014 | Gillespey | |
| 2015/0202975 A1 | 7/2015 | Solomon et al. | |
| 2015/0314697 A1 | 11/2015 | Chen et al. | |
| 2016/0068076 A1* | 3/2016 | Seo | B60L 1/02 |
| | | | 701/22 |
| 2016/0363991 A1 | 12/2016 | Schlecht et al. | |
| 2018/0065544 A1* | 3/2018 | Brusco | B60L 1/14 |
| 2019/0217715 A1 | 7/2019 | Christen et al. | |
| 2019/0232795 A1 | 8/2019 | Zendler et al. | |
| 2020/0006969 A1 | 1/2020 | Penilla et al. | |
| 2020/0101858 A1 | 4/2020 | Kuroda et al. | |
| 2023/0066396 A1* | 3/2023 | Lee | B60L 8/003 |

* cited by examiner

METHOD OF PROVIDING INFORMATION WHEN AN ELECTRIC VEHICLE IS USED AS A BATTERY PACK

The present disclosure relates to systems and methods for providing information related to a charge status of an electric vehicle.

With increasing number of electric vehicles and the expanded use of electric vehicle, such as using the electrical system within an electric vehicle to provide power to an external electrical device, it is important to efficiently use the power of the electric vehicle and to be aware of current level of charge of the electric vehicle. Further, it is important that when using an external electrical device, a user does not drain the level of charge of the electric vehicle to a point where there is insufficient charge remaining to get the electric vehicle to a charging station or home.

Thus, while current systems and methods achieve their intended purpose, there is a need for a new and improved system and method for providing information related to a charge status of an electric vehicle when the electric vehicle is being used as a battery pack for an external electrical device.

SUMMARY

According to several aspects of the present disclosure, a method of providing information related to a charge status of an electric vehicle when the electric vehicle is being used as a battery pack includes detecting, with a system controller in communication with an electrical system within the vehicle, when the electric vehicle is being used to provide power to an external electrical device, and when the electric vehicle is being used to provide power to an external electrical device: monitoring, with the system controller in communication with the electrical system within the electric vehicle, information related to a charge status of the electric vehicle, and providing notification, to a person in proximity to the electric vehicle, with the system controller, the charge status of the electric vehicle.

According to another aspect, the monitoring, with the system controller in communication with the electrical system within the electric vehicle, information related to a charge status of the electric vehicle further includes monitoring, with the system controller, at least one of: a level of charge of the electrical system within the vehicle, and a time left until the level of charge of the electric vehicle falls to a pre-determined threshold.

According to another aspect, the monitoring, with the system controller, a time left until the level of charge of the electric vehicle falls to a pre-determined threshold further includes calculating the pre-determined threshold based on when the level of charge of the electric vehicle is sufficient to allow the electric vehicle to travel from a current location to a planned destination.

According to another aspect, the calculating the pre-determined threshold based on when the level of charge of the electric vehicle is sufficient to allow the electric vehicle to travel from a current location to a planned destination further includes: tracking, with the system controller, the amount of electrical power being drawn by the external electrical device, calculating, with the system controller, the level of charge of the electric vehicle sufficient to allow the electric vehicle to travel from the current location to the planned destination, and setting, with the system controller, the pre-determined threshold at the level of charge of the electric vehicle sufficient to allow the electric vehicle to travel from the current location to the planned destination.

According to another aspect, the calculating the pre-determined threshold based on when the level of charge of the electric vehicle is sufficient to allow the electric vehicle to travel from a current location to a planned destination further includes receiving, with the system controller, information related to the planned destination from at least one of: input from a user of the electric vehicle, and input from a navigation system within the electric vehicle, wherein the planned destination is one of a charging station or a home location.

According to another aspect, the providing notification, to a person in proximity to the electric vehicle, with the system controller, the charge status of the electric vehicle further includes at least one of: providing notification that the level of charge of the electric vehicle is approaching the pre-determined threshold when the level of charge of the electric vehicle is approaching the pre-determined threshold, and providing notification that the level of charge of the electric vehicle is at the pre-determined threshold when the level of charge of the electric vehicle is at the pre-determined threshold.

According to another aspect, the providing notification, to a person in proximity to the electric vehicle, with the system controller, the charge status of the electric vehicle further includes, displaying, with an internal/external display system in communication with the system controller and adapted to project information onto a window surface of the vehicle, the current level of charge of the electric vehicle and a warning message, wherein the projected information is visible from inside the vehicle and from outside the vehicle.

According to another aspect, the providing notification, to a person in proximity to the electric vehicle, with the system controller, the charge status of the electric vehicle further includes at least one of: actuating, with a lighting system within the electric vehicle and in communication with the system controller, at least one exterior light of the electric vehicle, and actuating, with the system controller, and audible device.

According to another aspect, the providing notification, to a person in proximity to the electric vehicle, with the system controller, the charge status of the electric vehicle further includes at least one of: displaying, with a first externally mounted projector in communication with the system controller, the current level of charge of the electric vehicle and a warning message onto a surface adjacent the vehicle, and displaying, with a second externally mounted projector in communication with the system controller, light outward from the electric vehicle onto floating particles within proximity of the electric vehicle, and creating a three-dimensional image including the current level of charge of the electric vehicle and a warning message.

According to another aspect, the providing notification, to a person in proximity to the electric vehicle, with the system controller, the charge status of the electric vehicle further includes: sending, with the system controller, information related to the charging status of the vehicle to a personal device associated with a person, and displaying, with the personal device, the current level of charge of the electric vehicle and a warning message.

According to another aspect, the providing notification, to a person in proximity to the electric vehicle, with the system controller, the charge status of the electric vehicle further includes preventing, with the system controller, electrical power from the electric vehicle from flowing to the externally connected electrical device.

According to several aspects of the present disclosure, a system for providing information related to a charge status of an electric vehicle when the electric vehicle is being used as a battery pack includes a system controller in communication with an electrical system within the electric vehicle, the system controller adapted to: detect when the electric vehicle is being used to provide power to an external electrical device, and when the electric vehicle is being used to provide power to an external electrical device, monitor information related to a charge status of the electric vehicle, including at least one of: a level of charge of the electrical system within the electric vehicle, and a time left until the level of charge of the electric vehicle falls a pre-determined threshold, wherein the system controller is adapted to calculate the pre-determined threshold by tracking the amount of electrical power being drawn by the external electrical device, calculating a level of charge of the electric vehicle sufficient to allow the electric vehicle to travel from a current location to a planned destination, and setting the pre-determined threshold at the level of charge of the electric vehicle sufficient to allow the electric vehicle to travel from the current location to the planned destination, and provide notification, to a person in proximity to the electric vehicle, with the system controller, the charge status of the electric vehicle.

According to another aspect, when calculating the pre-determined threshold, the system controller is further adapted to receive information related to the planned destination from at least one of: input from a user of the electric vehicle, and input from a navigation system within the electric vehicle, wherein the planned destination is one of a charging station or a home location.

According to another aspect, when providing notification, to a person in proximity to the electric vehicle, the charge status of the electric vehicle, the system controller is further adapted to at least one of: provide notification that the level of charge of the electric vehicle is approaching the pre-determined threshold when the level of charge of the electric vehicle is approaching the pre-determined threshold, and provide notification that the level of charge of the electric vehicle is at the pre-determined threshold when the level of charge of the electric vehicle is at the pre-determined threshold.

According to another aspect, when providing notification, to a person in proximity to the electric vehicle, the charge status of the electric vehicle, the system controller is further adapted to display, with an internal/external display system in communication with the system controller and adapted to project information onto a window surface of the electric vehicle, the current level of charge of the electric vehicle and a warning message.

According to another aspect, when providing notification, to a person in proximity to the electric vehicle, the charge status of the electric vehicle, the system controller is further adapted to at least one of: actuate, with a lighting system within the electric vehicle and in communication with the system controller, at least one exterior light of the electric vehicle, and actuate, with the system controller, an audible device.

According to another aspect, when providing notification, to a person in proximity to the electric vehicle, with the system controller, the charge status of the electric vehicle, the system controller is further adapted to at least one of: display, with a first externally mounted projector in communication with the system controller, the current level of charge of the electric vehicle and a warning message onto a surface adjacent the vehicle, and display, with a second externally mounted projector in communication with the system controller, light outward from the electric vehicle onto floating particles within proximity of the electric vehicle, and creating a three-dimensional image including the current level of charge of the electric vehicle and a warning message.

According to another aspect, when providing notification, to a person in proximity to the electric vehicle, with the system controller, the charge status of the electric vehicle, the system controller is further adapted to: send information related to the charging status of the vehicle to a personal device associated with a person, and display, with the personal device, the current level of charge of the electric vehicle and a warning message.

According to another aspect, when providing notification, to a person in proximity to the electric vehicle, with the system controller, the charge status of the electric vehicle, the system controller is further adapted to prevent electrical power from the electric vehicle from flowing to the externally connected electrical device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
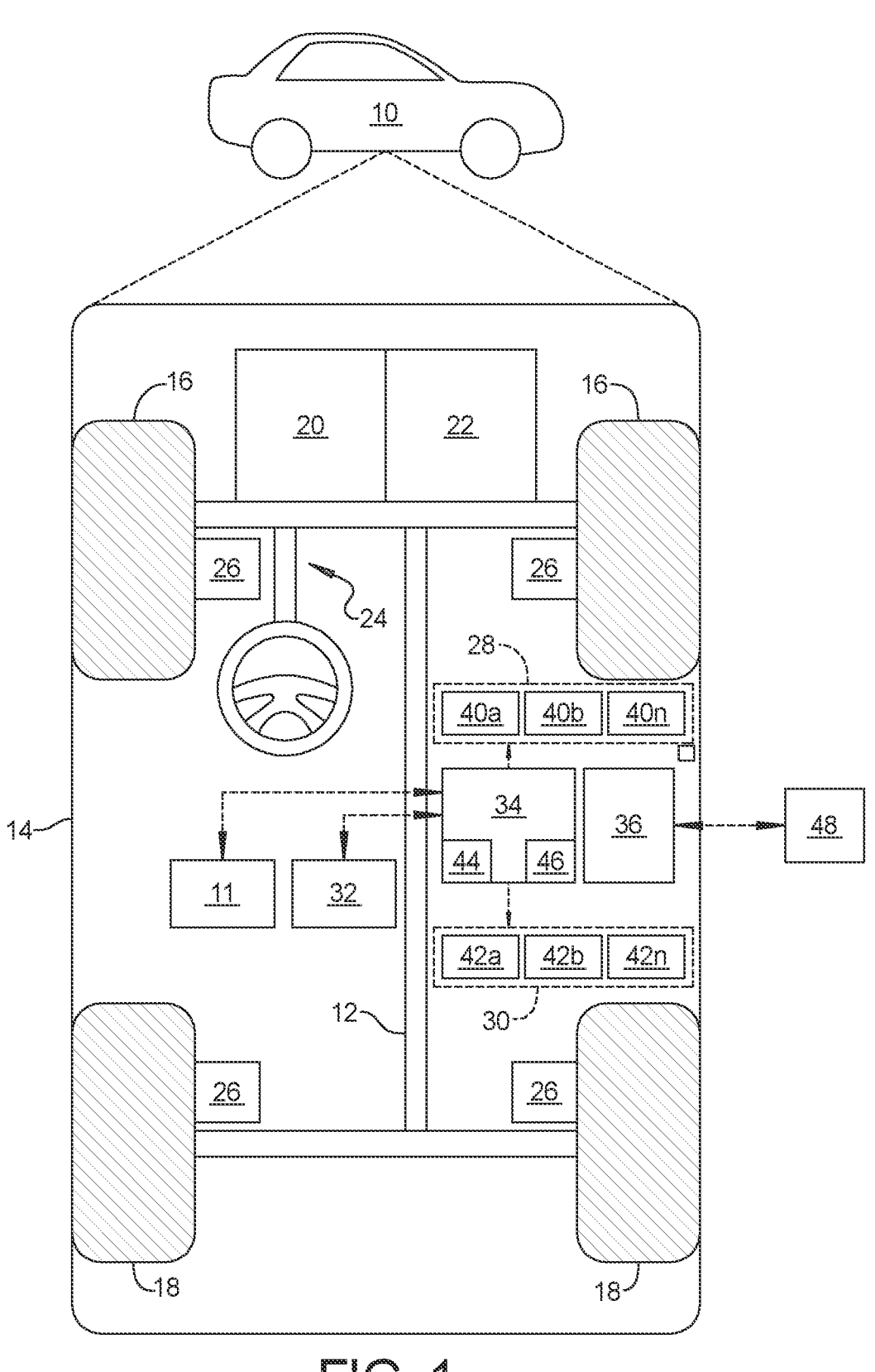
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows an electric vehicle 10 with an associated system 11 for providing information related to a charge status of the electric vehicle 10 when the electric vehicle is being used as a battery pack in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities

48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
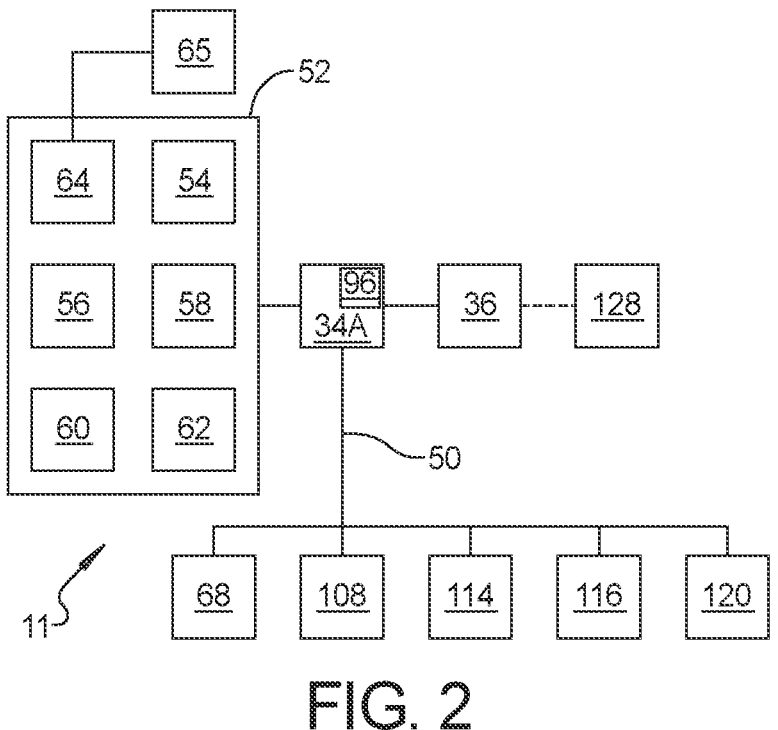
FIG. 2 is a schematic diagram of a system according to an exemplary embodiment.

Referring to FIG. 2, the system 11 is shown in more detail, wherein, the system 11 includes a system controller 34A. The system controller 34A may be the vehicle controller 34, or the system controller 34A may be a separate controller in communication with the vehicle controller 34. The system controller 34A is in communication, over a vehicle communication bus 50, with an electrical system 52 of the electric vehicle 10. The electrical system 52 includes a battery pack 54, power inverter 56, electric motor 58, onboard battery charger 60 and a battery management system 62.

The system controller 34A is adapted to monitor information related to a charge status of the vehicle 10 when the electric vehicle is being used as a battery pack. Using the electric vehicle as a battery pack to power an external electrical device, known as vehicle-to-load (V2L) is a feature available on some battery electric vehicles that lets them use their stored energy to power external devices, such as electrical camping equipment, power tools and a variety of consumer devices. Typically, electric vehicles do not use a significant portion of their battery's capacity in day-to-day travel, which means the battery sits idle much of the time. V2L technology lets a user utilize the battery power of the electric vehicle, even when the electric vehicle is turned off. The electric vehicle 10 includes an internal power converter 64 that is capable of pulling DC power from the battery pack 54 and converting it to the AC current for an attached external electrical device 65. The onboard charger (OBC) 60 enables this function by switching from drawing power to supplying power at the appropriate regional voltage level for the device (120V for most North American devices and 220V globally). The OBC 60 facilitates system-level battery management and is an essential component to achieve functional safety demands of externally connected electrical devices by acting as a fail-safe to prevent an overload, shutting off power if the load exceeds operating limits and mitigating the risk of electrical failure by creating a separation between the externally connected electrical device and internal components.

In an exemplary embodiment, the system controller 34A is adapted to detect when the electric vehicle 10 is being used to provide power to an external electrical device 65. If the system controller 34A detects that the electric vehicle 10 is being used to power an external electrical device 65, then the system controller 34A is further adapted to monitor at least one of a level of charge of the electrical system 52 within the vehicle 10, and a time left until the level of charge of the electric vehicle 10 falls to a pre-determined threshold, and to provide notification, to a person 66 in proximity to the electric vehicle 10, the charge status of the electric vehicle 10.

In an exemplary embodiment, the system controller 34A is adapted to calculate the pre-determined threshold based on when the level of charge of the electric vehicle 10 is sufficient to allow the electric vehicle 10 to travel from a current location to a planned or predicted destination. When calculating the pre-determined threshold, the system controller 34A tracks the amount of electrical power being drawn by the external electrical device 65, calculates the level of charge of the electric vehicle 10 that is sufficient to allow the electric vehicle 10 to travel from the current location to the planned destination, and sets the pre-determined threshold at the level of charge of the electric vehicle 10 sufficient to allow the electric vehicle 10 to travel from the current location to the planned destination.

When calculating the pre-determined threshold, the system controller 34A receives information related to the planned destination from at least one of input from a user of the electric vehicle 10, and input from a navigation system within the electric vehicle 10, wherein the planned destination is one of a charging station or a home location. For example, referring to FIG. 3, a person 66 is using a power saw 65. The system controller 34A receives information for the planned destination, which is the destination of the electric vehicle 10 after the person 66 leaves a current location. Information about the planned destination may be entered directly by the person 66, or the system controller 34A may gather such information by accessing a navigation system or personal device of the person 66. In this example, the system controller 34A receives information that when work is complete, the electric vehicle 10 will need to travel one hundred miles from the current location (work site) to the planned destination (person's 66 home). The electric vehicle 10 will need at least a 25% charge to travel one hundred miles, so the system controller 34A sets the pre-determined threshold at 25%. The system controller 34A can further use the rate of power usage of the external device 65 to calculate how much time is left for the level of charge of the electric vehicle 10 to fall to the pre-determined threshold.

In another exemplary embodiment, the pre-determined threshold is automatically calculated with a safety margin to accommodate for unexpected stops or detours. For example, if the electric vehicle 10 needs 25% battery charge to travel one hundred miles to the person's 66 home, the system controller 34A will calculate the pre-determined threshold as 25%, the minimum battery charge necessary to travel the one hundred miles, plus an additional 10% to account for an unexpected stop or a detour due to construction or traffic, etc. Thus, the pre-determined threshold in this example is calculated at 35%.

In another exemplary embodiment, when calculating the pre-determined threshold, the system controller 34A receives information related to the planned destination from stored history of previous trip patterns. For example, if a person 66 has worked at a particular location for a period of time, such as six months, and over that six-month time frame, each day, when work is complete, the person 66 drives the electric vehicle 10 first, to a convenience store, then to a day care center to pick up a child, and then to the person's home. The system controller 34A may recognize this pattern, and determine the planned destination (convenience store, day care center, then home) and calculate the pre-determined threshold based on assuming that pattern will be repeated, even when no direct information is provided on what the planned destination is.

In another example, the system controller 34A receives information for the planned destination, even when a person 66 has not indicated, either directly or via accessing a personal device/navigation system, what the planned destination is. The system controller, via communication with electric vehicle charging station infrastructure networks can identify how far it is to the next available charging station, and designate that charging station as the planned destination. In this example, the system controller 34A receives information that when work is complete, the electric vehicle 10 will need to travel at least one hundred miles from the current location (work site) to the planned destination (closest available charging station). The electric vehicle 10 will need at least a 25% charge to travel one hundred miles, so the system controller 34A sets the pre-determined threshold at 25%. The system controller 34A can further use the rate of power usage of the external device 65 to calculate how much time is left for the level of charge of the electric vehicle 10 to fall to the pre-determined threshold.

The system controller 34A is further adapted to provide notification, for a person 66 in proximity of the vehicle 10, information related to a charge status of the electric vehicle 10, including, at least one of (1) a level of charge of the electrical system 52 within the vehicle 10, and (2) a time left until the level of charge of the electric vehicle 10 falls to the pre-determined threshold. In an exemplary embodiment, when providing notification, to a person 66 in proximity to the electric vehicle 10, the charge status of the electric vehicle 10, the system controller 34A is adapted to provide notification that the level of charge of the electric vehicle 10 is approaching the pre-determined threshold when the level of charge of the electric vehicle 10 is approaching the pre-determined threshold, and to provide notification that the level of charge of the electric vehicle 10 is at the pre-determined threshold when the level of charge of the electric vehicle 10 is at the pre-determined threshold.

In an exemplary embodiment, when displaying information related to the charge status of the vehicle 10, the system controller 34A is further adapted to display, with an internal/external display system 68 in communication with the system controller 34A and adapted to project information onto a window surface 70 of the electric vehicle 10, information related to the charge status of the vehicle 10, wherein, the projected information related to the charge status of the vehicle 10 is visible from within the vehicle 10 and from outside the vehicle 10.

Referring again to FIG. 3, in an exemplary embodiment, the internal/external display system 68 comprises a hybrid augmented reality head up display (HUD) 68. The system controller 34A uses the HUD 68 to provide a notification 72 of the current charge level 74 of the electric vehicle 10 that is being used to power the power saw 65 and a time remaining 76 before the level of charge of the electric vehicle 10 falls to the pre-determined threshold onto the windshield 70A. Likewise, referring to FIG. 4, in another exemplary embodiment, the system controller 34A uses the HUD 68 to display the current charge level 74 of the electric vehicle 10 that is being used to power the power saw 65 and a time remaining 76 before the level of charge of the electric vehicle 10 falls to the pre-determined threshold onto a side window 70B. The displayed current charge level 74 and time remaining 76 may be represented with textual information, such as shown in FIG. 3 and FIG. 4, or may be shown with graphics that provide an illustrative representation of the information.

Figure 3:
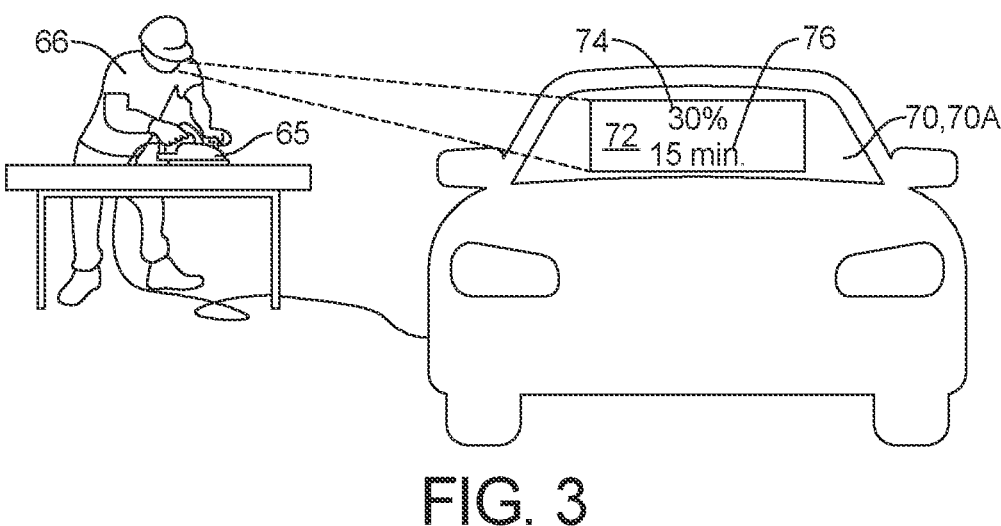
FIG. 3 is a schematic front view of a vehicle that is connected to an external electrical device.
Figures 4, 5, 6:
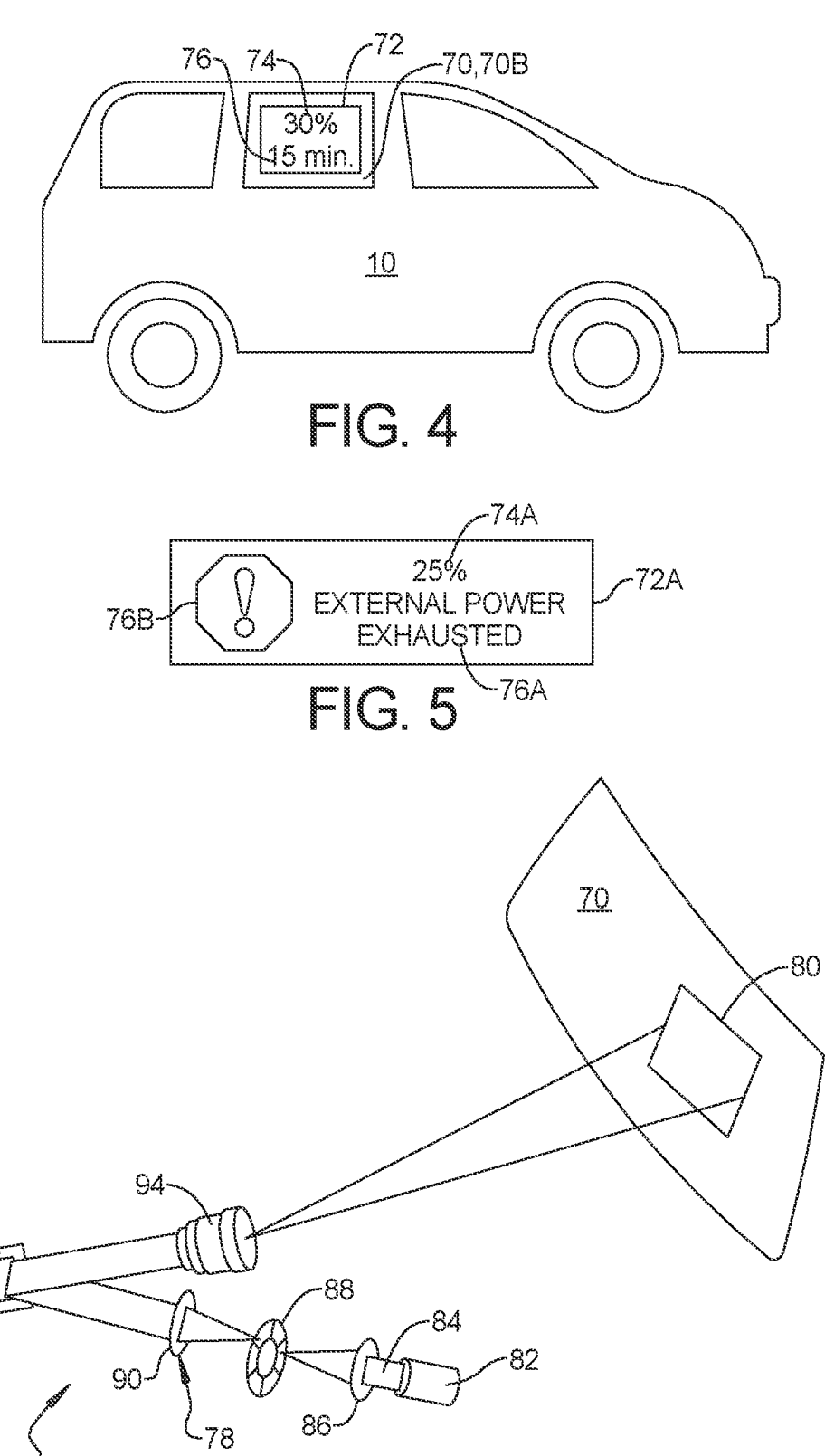
FIG. 4 is schematic side view of the vehicle shown in FIG. 3.
FIG. 5 is a view of a notification indicating that the current level of charge of the electric vehicle is 25%.
FIG. 6 is a schematic view of a hybrid augmented reality head up display system for the system.

Thus, as shown in FIG. 3 and FIG. 4, according to the example provided above, the system controller 34A provides a notification 72 that the level of charge of the electric vehicle 10 is approaching the pre-determined threshold of 25% when the level of charge 74 of the electric vehicle 10 is approaching the pre-determined threshold. As shown, the notification 72 includes the current level of charge 74, which is 30%, and approaching the pre-determined threshold of 25%. Further, the notification 72 includes the time remaining 76 until the level of charge of the electric vehicle 10 falls to the pre-determined threshold, and thus a warning message to the person 66 that they only have 15 minutes of available time left to use the power saw 65. In this way, the system controller 34A ensures that the person 66 can plan when to stop using the externally connected electrical device 65 (power saw) and does not drain the battery pack 54 of the electric vehicle 10 to a point where the vehicle cannot make it to the planned destination (home or charging station).

Referring to FIG. 5, in an exemplary embodiment, the system controller 34A uses the HUD 68 to display a notification 72A including the current charge level 74A of the electric vehicle 10 that is being used to power the power saw 65 and warning message 76A indicating that the level of charge of the electric vehicle 10 is at the pre-determined threshold onto the windshield 70A. The displayed current charge level 74A and warning message 76A may be represented with textual information, and may include a graphic 76B, such as shown in FIG. 5.

Thus, as shown in FIG. 5, according to the example provided above, the system controller 34A provides the notification 72A that the level of charge of the electric vehicle 10 is at the pre-determined threshold of 25% when the level of charge 74A of the electric vehicle 10 is at 25%. As shown, the notification 72A includes the current level of charge 74A, which is 25% and is the pre-determined threshold. Further, the notification 72A includes a warning message 76A alerting the person 66 using the power saw 65 that power available for usage of the power saw 65 has been exhausted. The message 76A further includes a graphic 76B that provides an illustrative alert that usage of the power saw 65 should be stopped. In this way, the system controller 34A ensures that the person 66 know that further use of the externally connected electrical device 65 (power saw) may result in draining the battery pack 54 of the electric vehicle 10 to a point where the vehicle cannot make it to the planned destination (home or charging station), and that usage of the externally connected electrical device 65 should be stopped immediately.

Displaying information such as the level of charge 74, 74A of the electric vehicle 10, time remaining 76 and a warning message 76A and/or graphic 76B with the internal/external display system 68 such as the HUD 68, allows a person 66 working with an externally connected electrical device 65 outside of the electric vehicle 10, as depicted in FIG. 3, to see the displayed information from a distance. For example, a person 66 may be working on something near the electric vehicle 10 and is able to periodically glance over to the electric vehicle 10 to see the level of charge of the electric vehicle 10 and plan for when they should stop using the externally connected electrical device 65, or see that usage of the externally connected electrical device 65 should be stopped immediately.

The internal/external display system 68 may use any suitable transparent display technology to display information onto the window surfaces 70 of the vehicle 10 to be viewed by persons both internally and externally, or, to be viewed only by persons external to the vehicle 10. Referring to FIG. 6, in an exemplary embodiment, the HUD 68 includes a digital light projector (DLP) 78 adapted to project images 80 onto a window surface 70 of the vehicle 10. The DLP 78 projects an image 80 that may contain various information, such as, by way of example, the level of charge 74, 74A, time remaining 76, warning message 76A and/or graphics 76B, as shown in FIG. 3, FIG. 4 and FIG. 5. The DLP 78 is capable of projecting two-dimensional and three-dimensional images. In an exemplary embodiment, the DLP 78 includes a light source 82 adapted to project an excitation light 84, a condensing lens 86 adapted to focus the excitation light 84 from the light source 82, a color filter 88 (color wheel) adapted to split the focused excitation light 84 into red, green and blue light, a shaping lens 90 adapted to focus the excitation light 84 passing through the color filter 88, a digital micro-mirror device (DMD) 92 adapted to re-direct the excitation light 84, and a projection lens 94 adapted to receive the excitation light 84 from the digital micro-mirror device (DMD) 92 and project the excitation light 84 to the window surface 70.

Referring to FIG. 2, the system controller 34A includes a DLP engine 96. The DLP engine 96 includes a programmable processor including programming to monitor various inputs and determine what information is appropriate to display. The DLP engine 96 can communication directly with various systems and components, or the DLP engine 96 can alternatively or additionally communicate over a LAN/CAN system. The window surfaces 70, 70A, 70B are equipped with features capable of displaying an image projected thereupon while remaining transparent or substantially transparent such that occupants within the vehicle 10 can clearly see displayed images 80 and still observe outside of the vehicle 10 through the window surfaces 70, 70A, 70B, and persons 66 outside of the vehicle 10 can clearly see displayed images 80 and still observe within of the vehicle 10 through the window surfaces 70, 70A, 70B.

The DLP engine 96 includes display software or programming translating requests to display information from the DLP engine 96 in graphical representations describing the information. The DLP engine 96 includes programming to compensate for the curved and tilted surface of the window surfaces 70, 70A, 70B. The DLP engine 96 controls the light source 82 which includes a laser or projector device producing an excitation light 84 to project the images 80.

Figure 7:
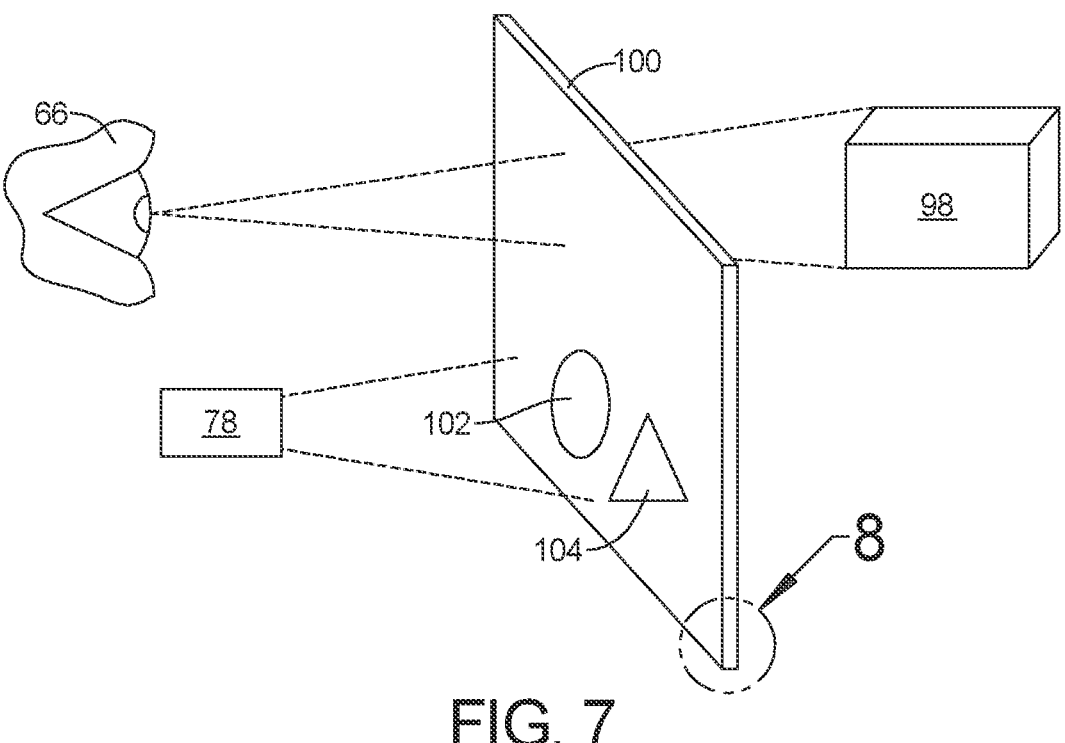
FIG. 7 is schematic illustration of a substrate for the windshield of the electric vehicle according to an exemplary embodiment.
Figure 8:
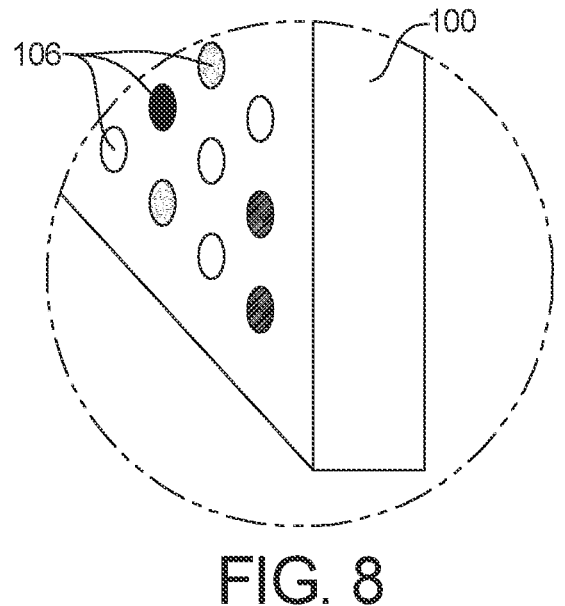
FIG. 8 is a enlarged portion of FIG. 7, as indicated by the circle labelled "7" in FIG. 7.

The window surfaces 70, 70A, 70B function as a medium through which relevant features are observable while serving as a display device upon which images 80, such as the charging status 72, time remaining 74 and current charge level 76 of FIG. 3 and FIG. 4 may be displayed. The window surfaces 70, 70A, 70B are both transparent and capable of displaying images projected by an excitation light 84. Referring to FIG. 7 and FIG. 8, a person 66 is able to see an arbitrary object (e.g. cube 98) through a substrate 100 positioned on the window surfaces 70, 70A, 70B. The substrate 100 may be transparent or substantially transparent. While the person 66 sees the arbitrary object 98 through the substrate 100, the person 66 can also see images (e.g. circle 102 and triangle 104) that are created at the substrate 100. The substrate 100 may be part of the window surfaces 70, 70A, 70B, a glass substrate, a plastic substrate, a polymer substrate, or other transparent (or substantially transparent) medium that would be appreciated by one of ordinary skill in the art. Other substrates may complement the substrate 100 to provide for tinting, substrate protection, light filtering (e.g. filtering external ultraviolet light), and other functions.

FIG. 8 depicts illumination of transparent displays illuminated with excitation light 84 (e.g. ultraviolet light or infrared light) from a light source 82. The substrate 100 receives excitation light 84 from the light source 82. The received excitation light 84 may be absorbed by light emitting material 106 at the substrate 100. When the light emitting material receives the excitation light 84, the light emitting material 106 emits visible light. Accordingly, images (e.g. circle 102 and triangle 104) may be created at the substrate 100 by selectively illuminating the substrate 100 with excitation light 84.

In an exemplary embodiment, the light emitting material 106 includes transparent phosphors that are embedded into the substrate 100. The transparent phosphors are light emitting particles which fluoresce in response to being excited by the excitation light 84. In an exemplary embodiment, the transparent phosphors are red, green, and blue (RGB) phosphors, allowing full color. The use of monochrome and/or two-color phosphors is also within the scope of the present disclosure. When excitation light 84 is absorbed by the transparent phosphors, visible light is emitted by the transparent phosphors. The excitation light 84 is provided by the light source 82. Use of the substrate 100 and light emitting material 106 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 84 may be ultraviolet light, in accordance with embodiments of the present disclosure. If the excitation light 84 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 106 absorbs the ultraviolet light and emits lower energy visible light, the ultraviolet light is down-converted to visible light because the ultraviolet light's energy level goes down when it is converted into visible light.

As shown in FIG. 6, the excitation light 84 is output by the light source 82 of the DLP 78. In an exemplary embodiment, the light source 82 is a micro-mirror array (MMA) projector (e.g. a digital light processing (DLP) projector 78). In the DLP 78, the images 80 are created by microscopically small mirrors laid out in a matrix on a semiconductor chip within the DMD 92. An MMA projector that outputs ultraviolet light may be similar to a MMA projector that outputs visible light, except that the color filter 68 has light filters that are tailored to the ultraviolet light spectrum. In other embodiments, the DLP 78 is a liquid crystal display (LCD) projector. In embodiments, the DLP 78 may be a liquid crystal on silicon (LCOS) projector. In embodiments, the DLP 78 may be an analog projector (e.g. a slide film projector or a movie film projector). One of ordinary skill in the art would appreciate other types of projectors which may be used to project ultraviolet light on the substrate 100.

Figure 9A:
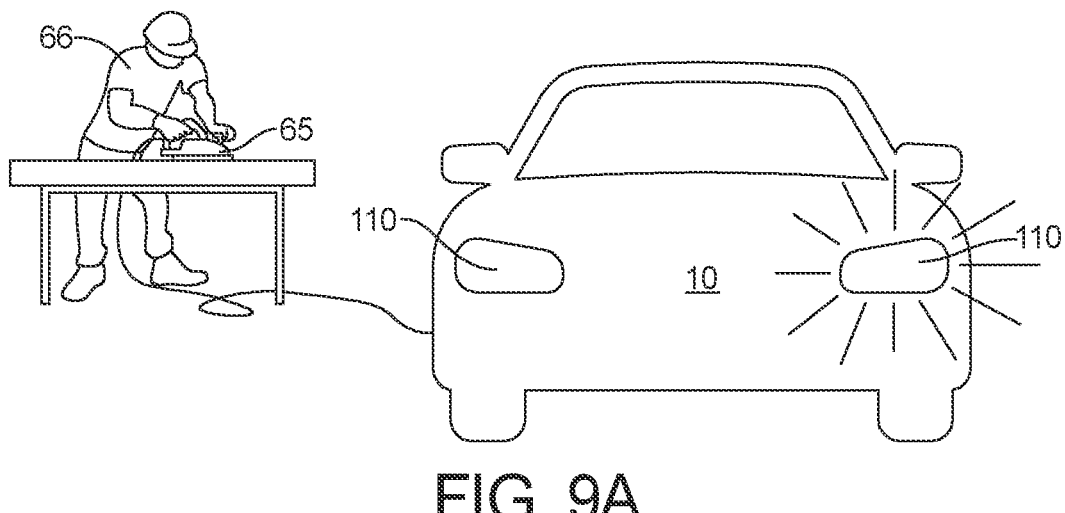
FIG. 9A is a schematic front view of an electric vehicle wherein the headlights of the electric vehicle are blinking.
Figure 9B:
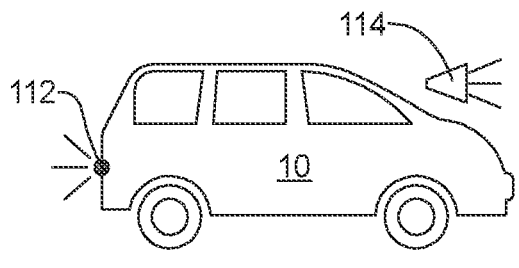
FIG. 9B is a schematic side view of the electric vehicle shown in FIG. 9A.

In an exemplary embodiment, when providing notification 72, 72A, to a person 66 in proximity to the electric vehicle 10, the charge status of the electric vehicle 10, the system controller 34A is further adapted to at least one of (1) actuate, with a lighting system 108 within the electric vehicle 10 and in communication with the system controller 34A, at least one external light of the vehicle 10, and (2) actuating, with the system controller 34A, an audible device 114. In an exemplary embodiment, the at least one external light comprises one or more of vehicle headlights 110 and vehicle tail-lights 112. Referring to FIG. 9A and FIG. 9B, the system controller 34A communicates information by actuating the headlights and/or tail lights of the vehicle 10. Thus, a person 66 outside of the vehicle 10, as depicted in FIG. 9A, can receive the information from a distance.

For example, the system controller 34A may be set up, as prompted by the person 66 ahead of time, to provide notification when there is fifteen minutes, as calculated by the system controller 34A, until the level of charge of the electric vehicle 10 is at the pre-determined threshold. Thus, a person 66 may be working at a distance from the electric vehicle 10 and still receive information from the system 11, wherein the headlights 110 and/or tail lights 112 coming on or blinking will draw the attention of the person 66 and alert the person 66 that they have fifteen minutes before they should stop using the externally connected electrical device 65.

By way of non-limiting examples, when the level of charge of the electric vehicle 10 is such that there is more than fifteen 15 minutes left until usage of the externally connected electrical device 65 will drain the level of charge of the electric vehicle to the pre-determined threshold, the headlights 110 and/or tail lights 112 may not do anything, and when the level of charge of the electric vehicle 10 is such that there is fifteen minutes left until usage of the externally connected electrical device 65 will drain the level of charge of the electric vehicle to the pre-determined threshold, the headlights 110 and/or tail lights 112 will begin to blink on/off periodically, with the headlights 110 and/or tail lights 112 blinking on/off more often as the level of charge of the electric vehicle 10 becomes closer to the pre-determined threshold. Finally, when the level of charge of the electric vehicle 10 reaches the pre-determined threshold, the headlights 110 and/or taillights 112 come on solid. Thus, the person 66 gets insight to the charging status based on what the headlights 110 and/or tail lights 112 are doing at any given moment.

In another non-limiting example, when the level of charge of the electric vehicle 10 is such that there is more than fifteen 15 minutes left until usage of the externally connected electrical device 65 will drain the level of charge of the electric vehicle to the pre-determined threshold, the audible device 114, such as a horn of the electric vehicle 10, may not do anything, and when the level of charge of the electric vehicle 10 is such that there is fifteen minutes left until usage of the externally connected electrical device 65 will drain the level of charge of the electric vehicle to the pre-determined threshold, the audible device 114 will begin to beep periodically, with the beeps occurring more often as the level of charge of the electric vehicle 10 becomes closer to the pre-determined threshold. Finally, when the level of charge of the electric vehicle 10 reaches the pre-determined threshold, the audible device gives three long beeps in rapid succession or sounds continuously until usage of the externally connected device 65 is stopped, which may be detected by the system controller 34A when the externally connected device 65 is no longer drawing power and/or when the externally connected device 65 is disconnected from the electric vehicle 10. Thus, the person 66 gets insight to the charging status based on hearing the beeps of the audible device 114, and how often they occur.

In another exemplary embodiment, when providing notification 72, 72A, to a person 66 in proximity to the electric vehicle 10, the charge status of the electric vehicle 10, the system controller 34A is further adapted to at least one of (1) display, with a first externally mounted projector 116 in communication with the system controller 34A, information related to the charge status of the vehicle 10 onto a surface 118 adjacent the vehicle 10, and (2) display, with a second externally mounted projector 120 in communication with the system controller 34A, light outward from the electric vehicle 10 onto floating particles within proximity of the electric vehicle 10, and creating a three-dimensional image 122 including information related to the charge status of the vehicle 10.

Figure 10:
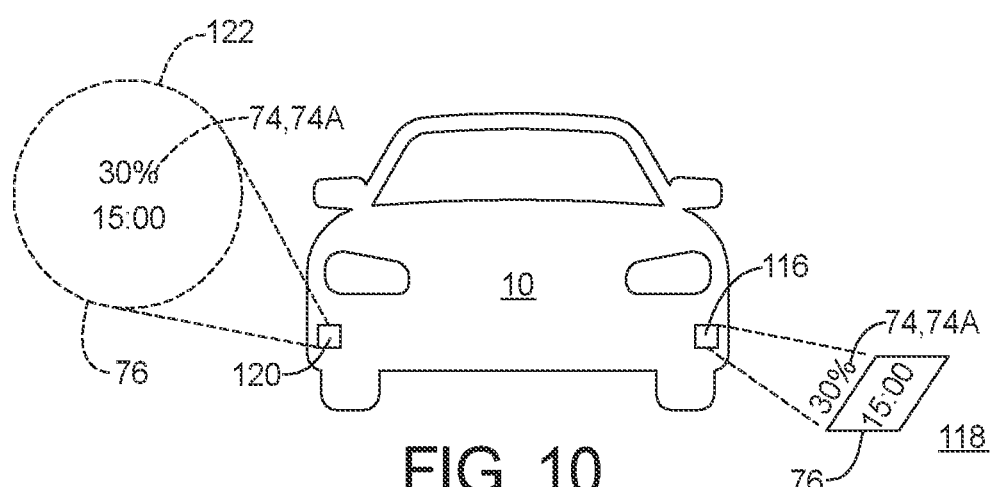
FIG. 10 is a schematic front view of an electric vehicle wherein an externally mounted projector displays information on a surface adjacent the vehicle.

Referring to FIG. 10, the externally mounted projector 116 projects the level of charge 74, 74A of the electric vehicle 10 and the time remaining 76 onto the surface 118, which as shown in FIG. 10 is the ground adjacent the vehicle 10. Further, the second externally mounted projector 120 projects light, such as laser light, outward that uses particles floating in the air in proximity to the vehicle 10, such as dust and mist, to create a three-dimensional image 122 including level of charge 74, 74A of the electric vehicle 10 and the time remaining 76. The second external projector 120 may use known methods for creating floating three-dimensional images by bouncing laser light off of dust and mist particles floating in the air or by other volumetric display methods to create a three-dimensional image 122 including the level of charge 74, 74A of the electric vehicle 10 and the time remaining 76, as shown in FIG. 10. Systems that utilize floating particles to create three-dimensional images 122 depend on consistency of the matrix of floating particles to create a "screen" for displaying (reflecting) projected light. A system that creates such a matrix of floating particles may be mounted within the vehicle 10, under the hood for example, to project such floating particles outward, wherein the three-dimensional image 122 appears floating immediately above the hood of the vehicle 10.

Displaying information such as the level of charge 74, 74A of the electric vehicle 10 and the time remaining 76 as shown in FIG. 10 allows a person 66 using an externally connected electrical device 65 outside of the vehicle 10 to see the displayed information from a distance. Thus, a person 66 is able to periodically glance over toward the electric vehicle 10 to see the level of charge 74, 74A of the electric vehicle 10 and the time remaining 76 displayed by either or both of the first and second externally mounted projectors 116, 120 and plan for when they should stop using the externally connected electrical device 65, or see that usage of the externally connected electrical device 65 should be stopped immediately.

In another exemplary embodiment, when providing notification 72, 72A, to a person 66 in proximity to the electric vehicle 10, the charge status of the electric vehicle 10, the system controller 34A is further adapted to send the level of charge 74, 74A of the electric vehicle 10 and the time remaining 76 until the level of charge of the electric vehicle 10 reaches the pre-determined threshold to a personal device 128 associated with a person 66, and display, with the personal device 128, level of charge 74, 74A of the electric vehicle 10 and the time remaining 76 and/or a warning message 76A and/or a graphic 76B.

Figure 11:
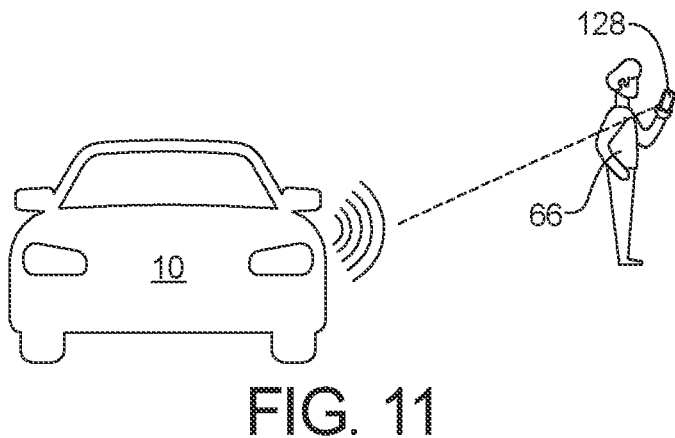
FIG. 11 is a schematic front view of an electric vehicle wherein a system controller sends information to a personal device associated with a person.

Referring to FIG. 11, by way of a non-limiting example, the communication system 36 sends information wirelessly to a personal device 128, as shown, a cell phone of the person 66. Thus, a person 66 located at a distance from the electric vehicle 10 can receive information such as the level of charge 74, 74A of the electric vehicle 10 and the time remaining 76 and/or a warning message 76A and/or a graphic 76B by simply glancing at the personal device 128, such as a cell phone, smart watch or tablet. Similarly, the cell phone, smart watch or tablet may generate a tactile signal indicating charge status information. Additionally, the system controller 34A may provide auditory charge level alerts to the person 66 via wireless communication with a Bluetooth or similar headphone/headset that is paired to the vehicle audio system, cell phone or other device.

In another exemplary embodiment, when providing notification 72, 72A, to a person 66 in proximity to the electric vehicle 10, the system controller 34A, is further adapted to prevent electrical power from the electric vehicle 10 from flowing to the externally connected electrical device 65. For example, when the level of charge of the electric vehicle 10 reaches the pre-determined threshold, the system controller 34A cuts power off from the externally connected electrical device 65 to prevent the level of charge of the electric vehicle 10 from going below the pre-determined threshold. This could be overridden by the person 66 if they "reset" the virtual circuit breaker.

In another exemplary embodiment, the system controller 34A is further adapted to provide notification, to a person in proximity to the electric vehicle, information related to the charge status of the electric vehicle 10 when a status request is initiated by at least one of (1) a manual request by a person 66, and (2) automatically based on a the level of charge of the electric vehicle and the time until the level of charge of the electric vehicle reaches the pre-determined threshold.

Figure 12:
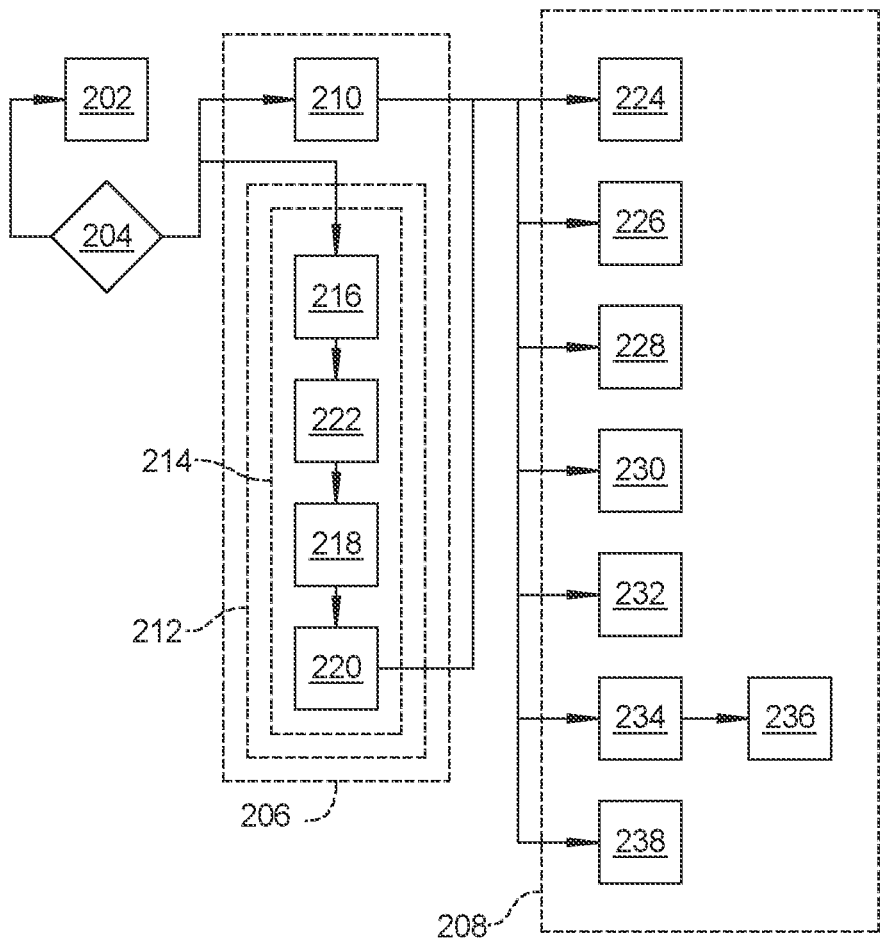
FIG. 12 is a flow chart illustrating a method according to an exemplary embodiment.

Referring to FIG. 12, a method 200 of providing information related to a charge status of an electric vehicle 10 when the electric vehicle 10 is being used as a battery pack includes, starting at block 202, detecting, with a system controller 34A in communication with an electrical system 52 within the electric vehicle 10, when the electric vehicle 10 is being used to provide power to an external electrical device 65. Moving to block 204, if the electric vehicle 10 is not being used to provide power to an external electrical device 65, then the method reverts back to block 202, and if the electric vehicle 10 is being used to provide power to an external electrical device 65, then the method 200 further includes, moving to block 206, monitoring, with the system controller 34A in communication with the electrical system 52 within the electric vehicle 10, information related to a charge status of the electric vehicle 10, and, moving to block 208, providing notification 72, 72A, to a person 66 in proximity to the electric vehicle 10, with the system controller 34A, the charge status of the electric vehicle 10.

In an exemplary embodiment, the monitoring, with the system controller 34A in communication with the electrical system 52 within the electric vehicle 10, information related to a charge status of the electric vehicle 10 at block 206, further includes monitoring, with the system controller 34A, at least one of, moving to block 210, a level of charge of the electrical system 52 within the electric vehicle 10, and, moving to block 212, a time left until the level of charge of the electric vehicle 10 falls to a pre-determined threshold.

In another exemplary embodiment, the monitoring, with the system controller 34A, a time left until the level of charge of the electric vehicle 10 falls to a pre-determined threshold at block 212 further includes, moving to block 214, calculating the pre-determined threshold based on when the level of charge of the electric vehicle 10 is sufficient to allow the electric vehicle 10 to travel from a current location to a planned destination.

In another exemplary embodiment, the calculating the pre-determined threshold based on when the level of charge of the electric vehicle is sufficient to allow the electric vehicle to travel from a current location to a planned destination at block 214 further includes, moving to block 216, tracking, with the system controller 34A, the amount of electrical power being drawn by the external electrical device 65, and, moving to block 218, calculating, with the system controller 34A, the level of charge of the electric vehicle 10 sufficient to allow the electric vehicle 10 to travel from the current location to the planned destination, and, moving to block 220, setting, with the system controller 34A, the pre-determined threshold at the level of charge of the electric vehicle 10 sufficient to allow the electric vehicle 10 to travel from the current location to the planned destination.

In another exemplary embodiment, the calculating the pre-determined threshold based on when the level of charge of the electric vehicle 10 is sufficient to allow the electric vehicle 10 to travel from a current location to a planned destination at block 214 further includes, moving to block 222, receiving, with the system controller 34A, information related to the planned destination from at least one of: input from a user of the electric vehicle 10, and input from a navigation system within the electric vehicle 10, wherein the planned destination is one of a charging station or a home location, prior to the calculating, with the system controller 34A, the level of charge of the electric vehicle 10 sufficient to allow the electric vehicle 10 to travel from the current location to the planned destination at block 218.

In an exemplary embodiment, the providing notification 72, 72A, to a person 66 in proximity to the electric vehicle 10, with the system controller 34A, the charge status of the electric vehicle 10 at block 208 further includes at least one of, providing notification 72, 72A that the level of charge of the electric vehicle 10 is approaching the pre-determined threshold when the level of charge of the electric vehicle 10 is approaching the pre-determined threshold, and providing notification that the level of charge of the electric vehicle 10 is at the pre-determined threshold when the level of charge of the electric vehicle 10 is at the pre-determined threshold.

In another exemplary embodiment, the providing notification 72, 72A, to a person 66 in proximity to the electric vehicle 10, with the system controller 34A, the charge status of the electric vehicle 10 at block 208 further includes, moving to block 224, displaying, with a hybrid augmented reality head-up display system 68 in communication with the system controller 34A and adapted to project information onto a window surface 70 of the electric vehicle 10, the current level of charge 74, 74A of the electric vehicle 10 and a warning message 76, 76A, 76B.

In another exemplary embodiment, the providing notification 72, 72A, to a person 66 in proximity to the electric vehicle 10, with the system controller 34A, the charge status of the electric vehicle 10 at block 208 further includes at least one of, moving to block 226, actuating, with a lighting system 108 within the electric vehicle 10 and in communication with the system controller 34A, at least one of vehicle headlights 110 and vehicle tail-lights 112 of the electric vehicle 10, and, moving to block 228, actuating, with the system controller 34A, an audible device 114.

In another exemplary embodiment, the providing notification 72, 72A, to a person 66 in proximity to the electric vehicle 10, with the system controller 34A, the charge status of the electric vehicle 10 at block 208 further includes at least one of, moving to block 230, displaying, with a first externally mounted projector 116 in communication with the system controller 34A, the current level of charge 74, 74A of the electric vehicle 10 and a warning message 76, 76A, 76B onto a surface 118 adjacent the electric vehicle 10, and, moving to block 232, displaying, with a second externally mounted projector 120 in communication with the system controller 34A, light outward from the electric vehicle 10 onto floating particles within proximity of the electric vehicle 10, and creating a three-dimensional image 122 including the current level of charge 74, 74A of the electric vehicle and a warning message 76, 76A, 76B.

In another exemplary embodiment, the providing notification 72, 72A, to a person 66 in proximity to the electric vehicle 10, with the system controller 34A, the charge status of the electric vehicle 10 at block 208 further includes, moving to block 234, sending, with the system controller 34A, information related to the charging status of the electric vehicle 10 to a personal device 128 associated with a person 66, and, moving to block 236, displaying, with the personal device 128, the current level of charge 74, 74A of the electric vehicle 10 and a warning message 76, 76A, 76B.

In another exemplary embodiment, the providing notification 72, 72A, to a person 66 in proximity to the electric vehicle 10, with the system controller 34A, the charge status of the electric vehicle 10 at block 208 further includes, moving to block 238, preventing, with the system controller 34A, electrical power from the electric vehicle 10 from flowing to the externally connected electrical device 65.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing information related to a charge status of an electric vehicle when the electric vehicle is being used as a battery pack, comprising:
   detecting, with a system controller in communication with an electrical system within the vehicle, when the electric vehicle is being used to provide power to an external electrical device; and
   when the electric vehicle is being used to provide power to the external electrical device:
   monitoring, with the system controller in communication with the electrical system within the electric vehicle, information related to a charge status of the electric vehicle; and
   providing notification, to a person in proximity to the electric vehicle, with the system controller, the charge status of the electric vehicle including:
      projecting, with a digital light projector (DLP) of a hybrid augmented reality head up display (HUD) in communication with the system controller, an excitation light onto a substrate including light emitting material that fluoresces in response to the excitation light, and displaying, on a window surface of the electric vehicle that is visible to both occupants within the electric vehicle and persons outside of the electric vehicle, the current level of charge of the electric vehicle and a warning message, wherein the projected information is visible from inside the vehicle and from outside the vehicle.

2. The method of claim 1, wherein the monitoring, with the system controller in communication with the electrical system within the electric vehicle, information related to the charge status of the electric vehicle further includes monitoring, with the system controller, at least one of:

a level of charge of the electrical system within the vehicle; and a time left until the level of charge of the electric vehicle falls to a pre-determined threshold.

3. The method of claim 2, wherein the monitoring, with the system controller, a time left until the level of charge of the electric vehicle falls to the pre-determined threshold further includes calculating the pre-determined threshold based on when the level of charge of the electric vehicle is sufficient to allow the electric vehicle to travel from a current location to a planned destination.

4. The method of claim 3, wherein the calculating the pre-determined threshold based on when the level of charge of the electric vehicle is sufficient to allow the electric vehicle to travel from the current location to the planned destination further includes:

tracking, with the system controller, the amount of electrical power being drawn by the external electrical device;

calculating, with the system controller, the level of charge of the electric vehicle sufficient to allow the electric vehicle to travel from the current location to the planned destination; and setting, with the system controller, the pre-determined threshold at the level of charge of the electric vehicle sufficient to allow the electric vehicle to travel from the current location to the planned destination.

5. The method of claim 4, wherein the calculating pre-determined threshold based on when the level of charge of the electric vehicle is sufficient to allow the electric vehicle to travel from the current location to the planned destination further includes receiving, with the system controller, information related to the planned destination from at least one of: input from a user of the electric vehicle, and input from a navigation system within the electric vehicle, wherein the planned destination is one of a charging station or a home location.

6. The method of claim 5, wherein providing notification, to the person in proximity to the electric vehicle, with the system controller, the charge status of the electric vehicle further includes at least one of:

providing notification that the level of charge of the electric vehicle is approaching the pre-determined threshold when the level of charge of the electric vehicle is approaching the pre-determined threshold; and providing notification that the level of charge of the electric vehicle is at the pre-determined threshold when the level of charge of the electric vehicle is at the pre-determined threshold.

7. The method of claim 6, wherein the providing notification, to the person in proximity to the electric vehicle, with the system controller, the charge status of the electric vehicle further includes at least one of:

actuating, with a lighting system within the electric vehicle and in communication with the system controller, at least one exterior light of the electric vehicle; and actuating, with the system controller, an audible device.

8. The method of claim 6, wherein the providing notification, to the person in proximity to the electric vehicle, with the system controller, the charge status of the electric vehicle further includes at least one of:

displaying, with a first externally mounted projector in communication with the system controller, the current level of charge of the electric vehicle and a warning message onto a surface adjacent the vehicle; and displaying, with a second externally mounted projector in communication with the system controller, light outward from the electric vehicle onto floating particles within proximity of the electric vehicle, and creating a three-dimensional image including the current level of charge of the electric vehicle and a warning message.

9. The method of claim 6, wherein the providing notification, to the person in proximity to the electric vehicle, with the system controller, the charge status of the electric vehicle further includes:

sending, with the system controller, information related to the charging status of the vehicle to a personal device associated with a person; and displaying, with the personal device, the current level of charge of the electric vehicle and a warning message.

10. The method of claim 6, wherein the providing notification, to the person in proximity to the electric vehicle, with the system controller, the charge status of the electric vehicle further includes preventing, with the system controller, electrical power from the electric vehicle from flowing to the externally connected electrical device.

11. A system for providing information related to a charge status of an electric vehicle when the electric vehicle is being used as a battery pack, comprising:

a system controller in communication with an electrical system within the electric vehicle, the system controller adapted to:

detect when the electric vehicle is being used to provide power to an external electrical device; and when the electric vehicle is being used to provide power to the external electrical device:

monitor information related to a charge status of the electric vehicle, including at least one of:

a level of charge of the electrical system within the electric vehicle; and a time left until the level of charge of the electric vehicle falls a pre-determined threshold, wherein the system controller is adapted to calculate the pre-determined threshold by:

tracking the amount of electrical power being drawn by the external electrical device;

calculating a level of charge of the electric vehicle sufficient to allow the electric vehicle to travel from a current location to a planned destination; and setting the pre-determined threshold at the level of charge of the electric vehicle sufficient to allow the electric vehicle to travel from the current location to the planned destination; and provide notification, to a person in proximity to the electric vehicle, with the system controller, the charge status of the electric vehicle, including:

projecting, with a digital light projector (DLP) of a hybrid augmented reality head up display (HUD) in communication with the system controller, an excitation light onto a substrate including light emitting material that fluoresces in response to the excitation light and displaying onto a window surface of the electric vehicle that is visible to both occupants within the electric vehicle and persons outside of the electric vehicle, the current level of charge of the electric vehicle and a warning message, wherein the projected information is visible from inside the vehicle and from outside the vehicle.

12. The system of claim 11, wherein when calculating the pre-determined threshold, the system controller is further adapted to receive information related to the planned destination from at least one of: input from a user of the electric vehicle, and input from a navigation system within the electric vehicle, wherein the planned destination is one of a charging station or a home location.

13. The system of claim 12, wherein when providing notification, to the person in proximity to the electric vehicle, the charge status of the electric vehicle, the system controller is further adapted to at least one of:

provide notification that the level of charge of the electric vehicle is approaching the pre-determined threshold when the level of charge of the electric vehicle is approaching the pre-determined threshold; and provide notification that the level of charge of the electric vehicle is at the pre-determined threshold when the level of charge of the electric vehicle is at the pre-determined threshold.

14. The system of claim 13, wherein when providing notification, to the person in proximity to the electric vehicle, the charge status of the electric vehicle, the system controller is further adapted to at least one of:

actuate, with a lighting system within the electric vehicle and in communication with the system controller, at least one exterior light of the electric vehicle; and actuate, with the system controller, an audible device.

15. The system of claim 13, wherein when providing notification, to the person in proximity to the electric vehicle, with the system controller, the charge status of the electric vehicle, the system controller is further adapted to at least one of:

display, with a first externally mounted projector in communication with the system controller, the current level of charge of the electric vehicle and a warning message onto a surface adjacent the vehicle; and display, with a second externally mounted projector in communication with the system controller, light outward from the electric vehicle onto floating particles within proximity of the electric vehicle, and creating a three-dimensional image including the current level of charge of the electric vehicle and a warning message.

16. The system of claim 13, wherein when providing notification, to the person in proximity to the electric vehicle, with the system controller, the charge status of the electric vehicle, the system controller is further adapted to:

send information related to the charging status of the vehicle to a personal device associated with the person; and display, with the personal device, the current level of charge of the electric vehicle and a warning message.

17. The system of claim 13, wherein when providing notification, to the person in proximity to the electric vehicle, with the system controller, the charge status of the electric vehicle, the system controller is further adapted to prevent electrical power from the electric vehicle from flowing to the externally connected electrical device.

* * * * *